W. J. ANSON.
MEANS FOR PROMOTING VEGETATION.
APPLICATION FILED DEC. 23, 1911.
1,190,699.
Patented July 11, 1916.
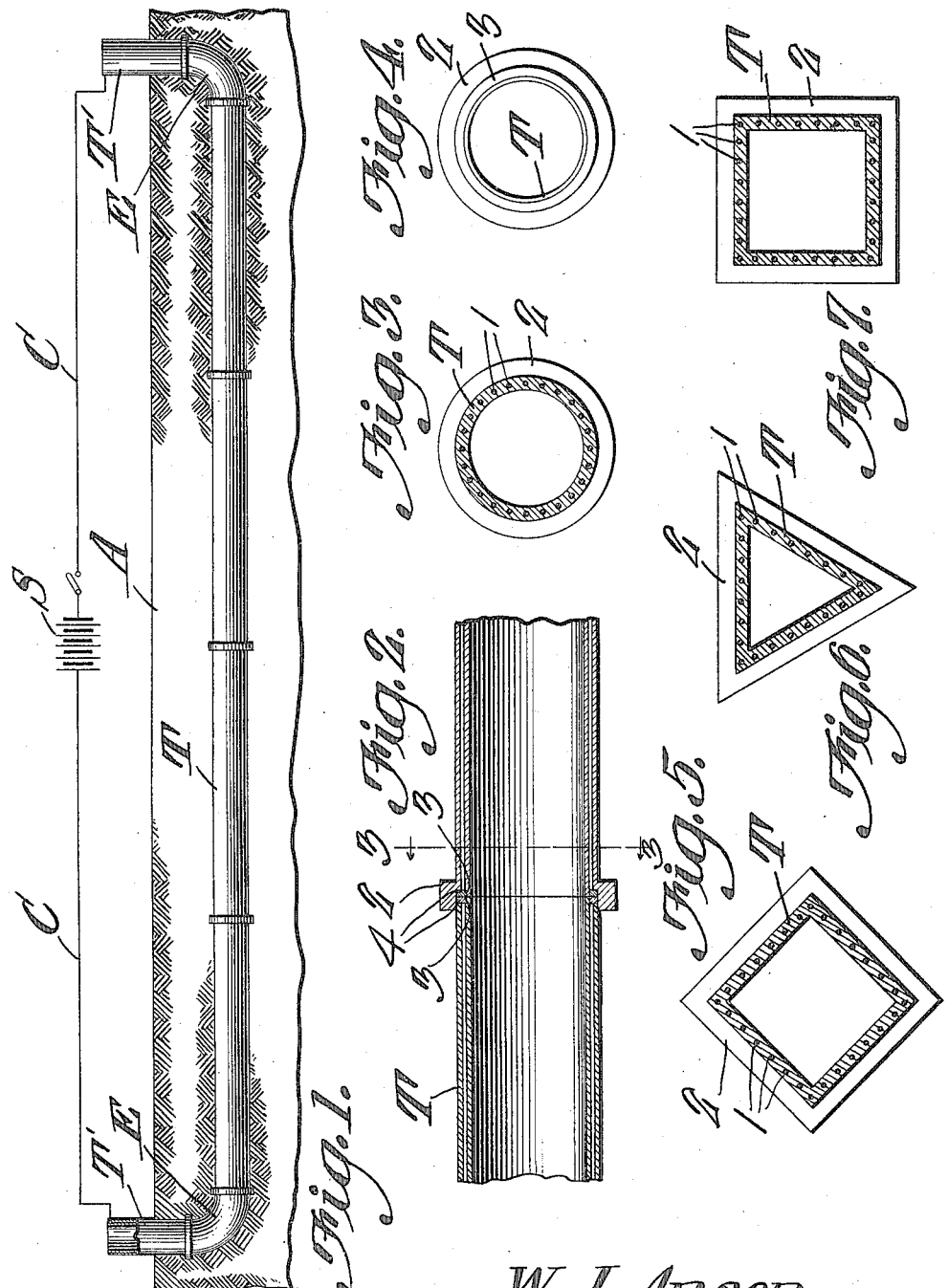
Witnesses
W. J. Anson  Inventor
by  Attorneys

UNITED STATES PATENT OFFICE.

WARREN J. ANSON, OF LOS ANGELES, CALIFORNIA.

MEANS FOR PROMOTING VEGETATION.

1,190,699.

Specification of Letters Patent.

Patented July 11, 1916.

Application filed December 23, 1911. Serial No. 667,535.

*To all whom it may concern:*

Be it known that I, WARREN J. ANSON, a citizen of the United States, residing at Los Angeles, in the county of Los Angeles and State of California, have invented a new and useful Means for Promoting Vegetation, of which the following is a specification.

The present invention relates to improvements in means for promoting vegetation, the primary object of the invention being the provision of a novel construction of porous foraminous moisture conserving and conducting medium for burial below the surface a sufficient depth to be cooler than the atmosphere above the surface thereby producing a condensation of the moisture from the air within the medium to be delivered through the porous cells to the roots of the plants, such porous cells also conveying sufficient air to the roots to aerate the roots and assist in the vegetation; such medium being further provided with bare electrical conductors for assisting the aerating and moistening effect.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a diagrammatic view demonstrating the apparatus and its installation. Fig. 2 is a longitudinal section through the adjacent ends of two sections of hollow cylindrical conduits. Fig. 3 is a section taken on line 3—3 of Fig. 2. Fig. 4 is an end view of one of said sections. Figs. 5, 6 and 7 are cross sections of three different shapes of conduits employed in carrying out this invention.

Referring to the drawings, A designates the loose soil, the same having been removed to permit the sinking or proper positioning of the sections T of the porous foraminous conduits, which as shown in Figs. 2, 3 and 4, are made cylindrical in cross section, while in Fig. 5 they are made rectangular, resting upon the diagonal corners; in Fig. 6 triangular in cross section; and in Fig. 7 square in cross section resting upon a flat base. These porous conduits are made of any desired material such as hard baked clay or cement, and have embedded therein or properly secured thereto any desired form of bare or insulated electrical conductors such as 1, said conductors being made of copper, well burned charcoal, graphite or in fact any carbonaceous material or metal that is a good conductor of electricity.

As shown in Figs. 1, 2, 3 and 4 the respective conduits are made in sections, and each section at its end is provided with the recessed portions 3 for the reception of the conducting ring 4 of any of the desired mentioned metals or carbon, the same being covered with the collar or ring 2 therearound and to provide a fastening means between the ends of the adjacent sections and also a cover for the conducting ring 4 which forms a conducting medium between the adjacent ends of the conductors 1 of the sections.

In installing the electrical apparatus for agricultural purposes, the soil is first given the proper tilling and thoroughly loosened to a depth of approximately twelve inches, a system of ditches being then made in which the respective conduits T are placed. The conduits are covered to a uniform depth of soil approximately twelve inches with the elbows E projecting to receive the terminal conduits T' which are open to the air and extend above the soil as indicated in Fig. 1.

In order to supply the electricity to the conductors 1 and 3 of the respective sections, the conductor wires C are connected at the respective ends of the sections T' and receive their current from the electrical source S, which may be batteries of any form of generator desired, the same simply being shown in diagram to illustrate the operation of the present method and apparatus.

The conduits are placed in the ground so that the respective terminals T' will be above the ground tilled, and the seeds are then planted and the soil kept agitated or stirred until the said seeds begin to grow. The said sections T' may be connected with aerial wires to secure from the atmosphere the atmospheric electricity to affect the atmosphere within the porous section. It has been found in practice that sections being laid the proper depth below the surface will thereby be cooler and cause the atmosphere which enters through the respective open ends thereof to have the temperature thereof lowered to such an extent as to cause a condensation of the moisture in the air, such condensation clinging to the porous walls of the sections to be conducted through the cells thereof into the soil surrounding the sections and finally to the roots of the growing plants. Sufficient air is also caused to pass through such cells to the roots to assist in aerating, this action having the same effect upon the plant life as the loosening of the soil during cultivation. Thus the air which enters the conduits in a heated condition due to the high temperature above the surface and carrying a certain amount of moisture will be cooled so that the moisture therein will condense and thus assist in supplying moisture to the roots of the plants.

It has been found in practice that the use of the conductors and the electrical current either supplied from a storage battery or other generator, has a beneficial effect upon the plant life and in climates when such irrigation has been found necessary, it has been demonstrated with the present apparatus that sufficient moisture is supplied to the plants under the surface as to render irrigation unnecessary.

The conduit being constructed of tile sections, will cause the conductors to be insulated from the soil or surrounding media by the tile sections of the conduit, in order that the full benefit of the current traversing the conductors will be had. It is also to be noted that the ends of the conductors 1 being connected to the contact rings or plates 4 embedded in the ends of the conduit sections, and said rings or plates bearing against one another, will electrically connect the conductors 1 of the respective conduit sections, at any angular positions of said sections relative to one another about their axes, so that no special attention is necessary for laying the conduit sections at any particular angular position relative to one another. The circular conduit sections may be laid at any angular position, whereas the angular conduit sections can be laid in any one of a number of angular positions.

When the air above the surface of the soil is hot, while the air within the conduit is cool, the soil adjacent the conduit will remain cool, and this will tend to retain the moisture in the soil. Now, supposing that the air above the soil is cool, while the air within the conduit is heated by the electrical current, the hot air will naturally flow upwardly out of the branches or risers of the conduit, while the cool air will flow downwardly into the conduit to be heated. Furthermore, during rainy weather, when the soil is saturated with moisture, the moisture will naturally seep into the conduit, due to the fact that the conduit is porous, and the conduit will hold the water until the soil becomes dry due to a drought, in which event, the current when traversing the conductor will tend to evaporate the water. The water will thus not only seep back into the soil, but will also flow by evaporation through the branches or risers to supply vapor to the plants. The roots are thus not only supplied with moisture, but the leaves and branches are also supplied therewith, the electrical current in passing through the conductor within the conduit will naturally charge the adjacent soil, it being recognized that the electrification or charging of the soil promotes vegetation, most likely due to the fact that the electrically charged soil stimulates the root growth of the plants, and also retains the moisture better than ordinary soil.

It is also well known that when an electric current traverses a conductor, the surrounding media is charged by induction, and with the present device, the soil surrounding and adjacent the conduit will naturally be charged, as well as the air within the conduit.

What is claimed is:

An appliance for promoting vegetation embodying a porous conduit adapted to be embedded in the soil and having upstanding branches to project above the surface of the soil, said conduit comprising abutting tile sections, each individual tile section being adapted to be laid in various angular positions about its axis, a plurality of electrical conductors embedded in the walls of each section and extending longitudinally thereof from end to end, and contact plates embedded within the ends of the sections, said conductors being connected with said plates, and said plates being adapted to bear against one another at various angular positions of the sections relative to one another, to connect said conductors for the passage of an electrical current.

In testimony that I claim the foregoing as my own, I have hereto affixed my signature in the presence of two witnesses.

WARREN J. ANSON.

Witnesses:
ARTHUR WRIGHT,
F. W. WACHTER.